(12) United States Patent
Hild

(10) Patent No.: US 12,166,640 B2
(45) Date of Patent: *Dec. 10, 2024

(54) DETERMINING NETWORK TOPOLOGY BASED ON PACKET TRAFFIC

(71) Applicant: Red Hat, Inc., Raleigh, NC (US)

(72) Inventor: Marcel Hild, Grasbrunn (DE)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/179,087

(22) Filed: Mar. 6, 2023

(65) Prior Publication Data

US 2023/0208721 A1    Jun. 29, 2023

Related U.S. Application Data

(63) Continuation of application No. 16/392,357, filed on Apr. 23, 2019, now Pat. No. 11,606,258.

(51) Int. Cl.
  *H04L 41/12* (2022.01)
  *G06N 3/08* (2023.01)
  *H04L 41/16* (2022.01)
  *H04L 43/04* (2022.01)
  *H04L 43/18* (2022.01)

(52) U.S. Cl.
  CPC .............. *H04L 41/12* (2013.01); *G06N 3/08* (2013.01); *H04L 41/16* (2013.01); *H04L 43/04* (2013.01); *H04L 43/18* (2013.01)

(58) Field of Classification Search
  CPC ........... G06N 3/08; H04L 41/12; H04L 41/16; H04L 41/122; H04L 41/147; H04L 43/04; H04L 43/18
  USPC .................. 370/242, 254; 709/203, 224
  See application file for complete search history.

(56) References Cited

U.S. PATENT DOCUMENTS

| | | | |
|---|---|---|---|
| 9,473,369 B2 | 10/2016 | Dixon et al. | |
| 9,621,431 B1* | 4/2017 | Cardente | H04L 41/147 |
| 10,142,353 B2 | 11/2018 | Yadav et al. | |
| 2009/0313198 A1 | 12/2009 | Kudo | |
| 2011/0082936 A1 | 4/2011 | Breslin et al. | |
| 2016/0105350 A1 | 4/2016 | Greifeneder et al. | |
| 2018/0123903 A1 | 5/2018 | Holla et al. | |
| 2020/0076841 A1 | 3/2020 | Hajimirsadeghi | |

(Continued)

OTHER PUBLICATIONS

Uila, Inc. "Full Stack Monitoring", 5 pages, located at https://www.uila.com/solutions/full-stack-monitoring, 2019.

(Continued)

*Primary Examiner* — Harun Chowdhury
(74) *Attorney, Agent, or Firm* — Womble Bond Dickinson (US) LLP

(57) ABSTRACT

In some implementations, a method is provided. The method includes receiving captured packet traffic, the captured packet traffic including a plurality of packets transmitted over a network. One or more communication patterns for each of one or more levels in a network stack are detected based on metadata of the captured packet traffic, each communication pattern indicating communication between two components in the network. The method further includes generating a topology of the network in view of the one or more communication patterns detected for each of the one or more levels in the network stack.

14 Claims, 6 Drawing Sheets

(56) References Cited

U.S. PATENT DOCUMENTS

2020/0162425 A1* 5/2020 Vasseur .................. H04L 43/16

OTHER PUBLICATIONS

Dynatrace LLC, "Application Topology Discovery and Mapping", 7 pages, located at https://www.dynatrace.com/platform/application-topology-discovery/, 2019.

* cited by examiner

| Physical | Data Link | Network | Transport | Application | Type | # of Packets |
|---|---|---|---|---|---|---|
| Frame | | | | | | 445 |
| | Ethernet | | | | | 445 |
| | | Internet Protocol Version 6 | | | | 178 |
| | | | TCP | | | 174 |
| | | | | HTTP | | 26 |
| | | | | | Portable Network Graphics | 2 |
| | | | | | Media Type | 1 |
| | | | | | Line-based text data | 4 |
| | | | | | Compuserve GIF | 5 |
| | | | | | ICMP V6 | 4 |
| | | Internet Protocol Version 4 | | | | 267 |
| | | | User datagram Protocol | | | 74 |
| | | | | | Dropbox LAN sync discovery pr | 2 |
| | | | | | Domain name system | 72 |
| | | | TCP | | | 188 |
| | | | | HTTP | | 21 |
| | | | | | Secure Sockets Layer | 24 |
| | | | | | Portable Network Graphics | 1 |
| | | | | | Line-based text data | 5 |
| | | | | | Compuserve GIF | 5 |
| | | | | | ICMP V6 | 5 |

DETERMINING NETWORK TOPOLOGY BASED ON PACKET TRAFFIC

RELATED APPLICATIONS

This application is a continuation of U.S. patent application Ser. No. 16/392,357, filed on Apr. 23, 2019, which is herein incorporated by reference in its entirety.

BACKGROUND

A network or data center may include a number of components (e.g., network devices, computing devices, an application running on a computing device or network device etc.) capable of communicating data with other devices through a wired or wireless connection or set of connections. For example, a network device may receive data from a first device (e.g., a first computing device, a first switch, a first router, etc.) and may forward the data to a second device (e.g., a second computing device, a second switch, a second router, etc.). A network device may have one or more applications running on it (e.g., development tools, inter-node communications etc.) to perform various functions and tasks.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a diagram of captured network traffic data statistics, in accordance with some embodiments of the present disclosure.

DETAILED DESCRIPTION

As discussed above, a network may include a number of components (e.g., a computing device, a network device, virtual machines, applications, etc.) that may communicate data with other components in the network (e.g., may receive data from a first component and may forward the data to a second component) as well as components outside of the network. Organizations may use configuration management databases (CMDBs) to store information about the hardware and software components that comprise the network. CMDBs may also serve to indicate the relationships between the components (e.g., how they are connected) that the network is comprised of. Stated differently, CMDBs may serve to indicate a topology of a network. However, many current networks and data centers have network topologies that are increasingly dynamic. For example, the use of network functions virtualization has resulted in networks that run applications on demand, using short lived containers. Even more complex services, such as database management, can be provided on demand by a user requesting the database from a self service portal, for example. Because of the increasingly dynamic nature of networks, creating an overview of a current network topology can be difficult. This problem is compounded by the need to have a network topology that reflects the full network stack, from installed hardware to applications running on the network.

Aspects of the present disclosure address the above noted and other deficiencies by building a network topology based on packet capture data (e.g., network traces) from various levels of the network stack. By building a network topology based on packet capture data from various levels of the network stack (e.g., application layer, transport layer, network layer), a network topology indicating the installed hardware, operating systems and applications running on the network may be built. The network topology may be built using packet data captured in real time (using e.g., network traces) that reflects the most recent communications between various components in the network. As a result, the network topology may represent the most current topology of the network.

Figure 1A:
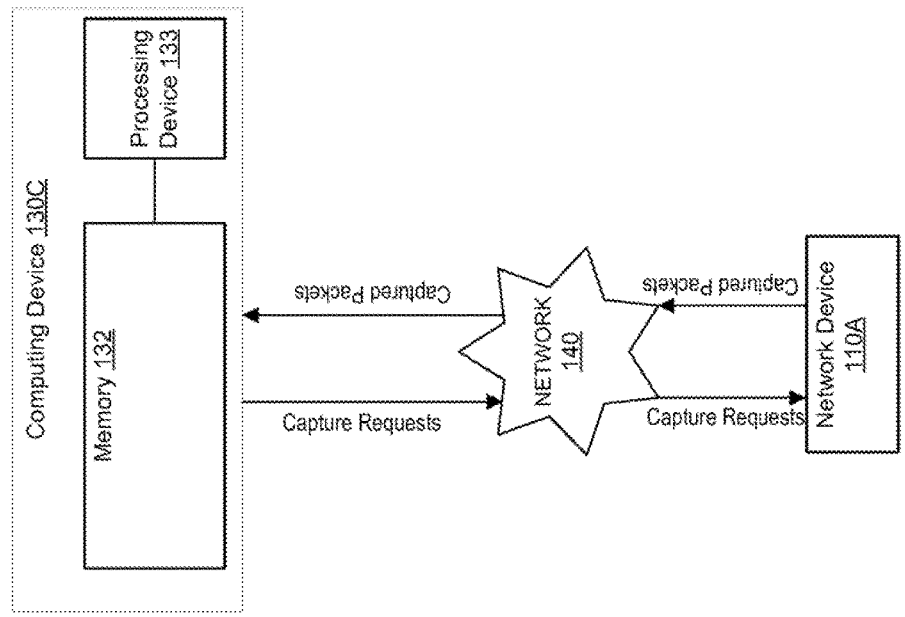
FIG. 1A is a block diagram illustrating an example of a network architecture, in accordance with some embodiments of the present disclosure.

FIG. 1A is a block diagram that illustrates an example network architecture 100, in accordance with some embodiments of the present disclosure. As illustrated in FIG. 1A, the network architecture 100 may include computing device 130C and network device 110A. Although illustrated as having only computing device 130C and network device 110A for simplicity, network architecture 100 may include any appropriate number of components (e.g., network devices, computing devices, containers, virtual machines, applications). The computing device 130C and the network device 110A may be coupled to each other (e.g., may be operatively coupled, communicatively coupled, may communicate data/messages (e.g., packet capture requests and captured packets) with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may also include various components such as switches, routers, bridges, gateways, servers computers, cables, chips integrated circuits, etc. The network 140 may carry communications (e.g., data, message, packets, frames, etc.) between computing device 130C, the network device 110A, and any other components of network architecture 100.

Figure 1B:
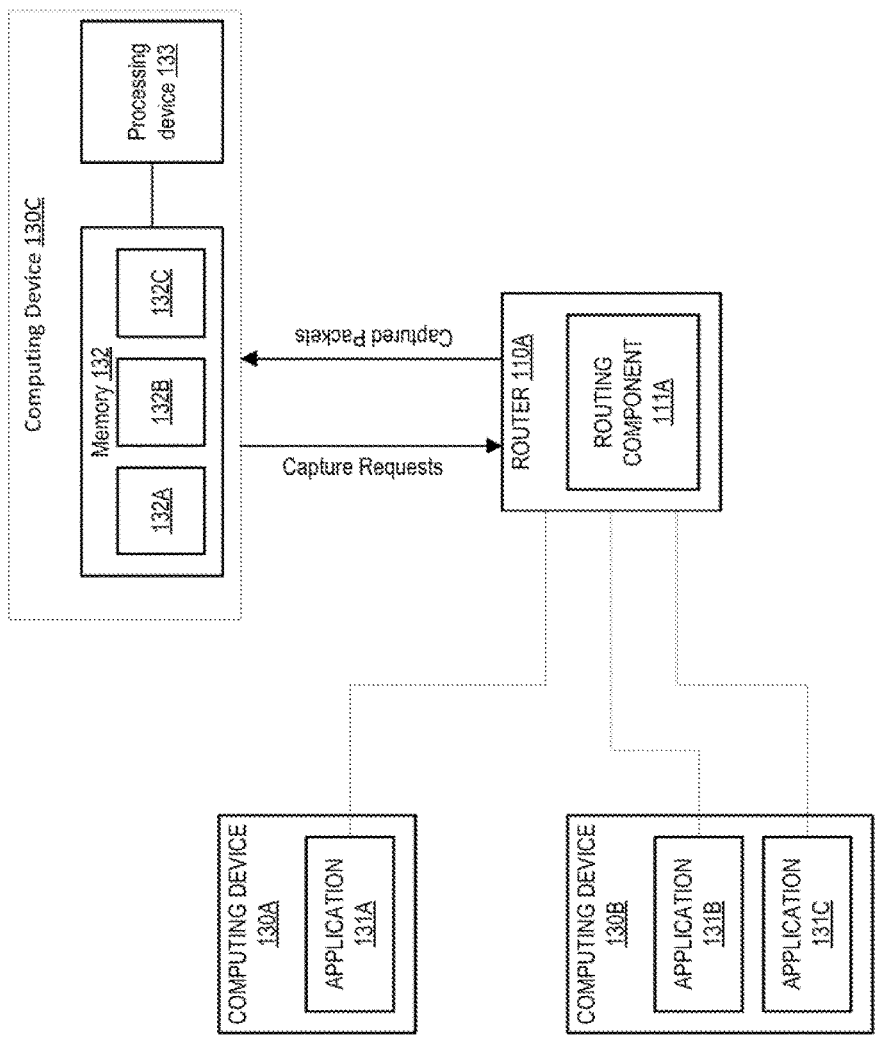
FIG. 1B is a block diagram illustrating an example of a network architecture, in accordance with some embodiments of the present disclosure.

FIG. 1B is a block diagram of the network architecture 100 in accordance with some embodiments of the present disclosure. The network architecture 100 includes a router 110A and computing devices 130A-C. The router 110A may include a routing component 111A. Computing devices 130A and B may each include one or more applications 131A-C. A computing device 130 and/or an application 131 of the computing device 130 may transmit data (e.g., messages, frames, packets, etc.) to other devices (e.g., other computing devices 130) via router 110A, and/or may receive data from other devices via routers 110A. Each computing device 130 may be coupled to the router 110A via one or more networks (not shown in FIG. 1B), such as network 140 illustrated in FIG. 1A.

In one embodiment, each computing device 130 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 130 may comprise any suitable type of computing device or machine that has a programmable processor including, for example, server computers, desktop computers, laptop computers, tablet computers, smartphones, set-top boxes, etc. In some examples, the computing devices 130 may be a single machine or may include multiple interconnected machines (e.g., multiple computers configured in a cluster). In another embodiment, one or more of computing devices 130 may be a virtual machine (VM). A VM may be an emulation of a computing device. The VM may execute on a hypervisor (not shown) which executes on top of an operating system for a host computing device. The hypervisor may manage system resources (e.g., may manage access to hardware devices, such as processors, memories, storage devices, etc., of the host computing device). The hypervisor may also emulate the hardware (or other physical resources) which may be used by the VMs to execute software and/or applications. As illustrated in FIG. 1B, computing devices 130A and B may each include one or more applications 131. An application 131 may be a program (e.g., a computer program), software, etc., that may execute on a computing device 130 to perform various functions, tasks, operations, etc. Applications 131 may be any application that uses network tracing, such as microservices applications, inter-node communication applications and development tools among others. Examples of applications 131 include, but are not limited to, a messaging application, a video application, a social networking application, a video sharing application, a photo sharing application, a chat application, a content (e.g., video, music, etc.) delivery application, a web browser, a media player, a gaming application (e.g., a video game), etc.

As discussed above, the computing devices 130 and/or the applications 131 may transmit packets to and/or receive packets from other components of the network architecture 100 via the router 110A. A packet (or message, frame, etc.) may include multiple portions. For example, a packet may include a packet header (also referred to as a header), a packet footer (also referred to as a footer) and a payload. The packet header may include information such as a source address and a destination address. A source address may be data (e.g., a value, a number, etc.) that may indicate the sender of the packet. For example, a source address may be an Internet Protocol (IP) address of a computing device 130 that transmitted the packet. A destination address may be data (e.g., a value, a number, etc.) that may indicate a recipient of the packet. For example, a destination address may be an Internet Protocol (IP) address of a receiving computing device. The packet header may also include information such as a source port and a destination port.

In one embodiment, a network device (such as a router 110A) may include multiple processing cores or may have access to multiple processing cores (e.g., may be able to use multiple processing cores for processing packets). A processing core may refer to separate processing devices (e.g., separate central processing units (CPUs), separate processors, etc.) or may refer to a single core of a processing device that has multiple cores (e.g., a single core of a multi-core CPU). It may be beneficial for the network device to use multiple processing cores for processing packets rather than a single processing core. For example, if flows (e.g., groups, streams, sets, etc.) of packets are received from each of the three applications 131 illustrated in FIG. 1B, the network device would be able to process the different flows of packets more quickly if a different processing core was used to process each flow of packets. This may allow the network device to process the three flows of packets simultaneously using three different processing cores (which decreases the amount of time it takes the networking device to process the three flows of packets). This may also allow the network device to parallelize the processing of the flows of packets. Various techniques such as receive side scaling (RSS) and receive packet steering (RPS) may be used to distribute packets (received by a networking device) to different processors and/or processing cores. Generally, these techniques (e.g., RSS, RPS, etc.) use the source address of packets to determine how to distribute the packets among the different processors and/or processing cores.

Each computing device 130 in the network architecture 100 may utilize encapsulation across the various layers of the network stack when transmitting packets elsewhere on the network architecture 100. Although illustrated using the TCP/IP network stack model, any appropriate network stack model (e.g., OSI) may be utilized. For example, application 131C may issue a request to view a web page from application 131A, which in this example may be a website hosted on computing device 130A (which may be a web server). From an application level perspective, application 131C may generate an HTTP request for the particular web page hosted on computing device 130A. As the HTTP request corresponds to the application layer of the network stack, in order for the HTTP request to reach computing device 130A, the request needs to be encapsulated across the various layers of the model. In some embodiments, the computing device 130B may encapsulate the HTTP request in a TCP header (the TCP protocol corresponding to the transport layer), and then an IP header (the IP protocol corresponding to the internet/network layer), and then generate an Ethernet frame (the Ethernet protocol corresponding to the physical layer), at which point computing device 130B may transmit the Ethernet frame to computing device 130A via router 110A (as discussed above). In some embodiments, several frames will be sent between the computing devices 130B and 130A to form a conversation between the 2 devices.

Although the present disclosure may refer to IPsec, IPsec packets, IPsec channels, etc., other embodiments may use other secure communication channels and other types of packets. For example, TLS channels/connections, virtual private network (VPN) channels/connections, virtual extensible LAN (VXLAN) channels/connections, etc., may be used. In addition, although while the present disclosure may refer to and/or illustrate routers, the embodiments are not meant to be limiting as other types of network devices such as a switch, a gateway, a bridge, etc., may perform the methods, functions, operations, etc., described herein. Furthermore although three computing devices 130A-C and three applications 131A-C are illustrated in FIG. 1B, it shall be understood that in other embodiments, any number of computing devices and/or applications may be used in the network architecture 100.

Computing device 130C may include memory 132 and processing device 133. Memory 132 may further include a deep packet inspection (DPI) software module 132A (hereinafter module 132A), a network topology generation software module 132B (hereinafter module 132B), and a communication pattern storage 132C (hereinafter storage 132C). Although illustrated as software modules stored in memory 132, in some embodiments, modules 132A and B may be implemented as firmware in processing device 133. In some embodiments, these software modules may be separate from the processing device 133 (e.g., may be a separate circuit, field programmable gate array (FPGA), application specific integrated circuit (ASIC), a process running on another processing device, etc.)

Computing device 130C may execute module 132A in order to capture packet traffic on the router 110A, and detect communication patterns at one or more levels of the network stack based on metadata from the captured packets as discussed herein. Each communication pattern may indicate characteristics of communication between two components in the network. Module 132A may be any appropriate packet inspection software such as the Wireshark™ program, for example. Computing device 130C may send packet capture requests to router 110A in order to obtain network traces indicating traffic on the network as will be described in further detail herein. In some embodiments, the requests from computing device 130C may instruct the router 110A to behave in a "promiscuous" mode, wherein all traffic visible on the port of router 110A specified in the request, including unicast traffic not sent to the router 110A's MAC address may be visible. Because some traffic through the router 110A may be sent to ports other than the port where the capture was requested, capturing with the router 110A in "promiscuous" mode may not be sufficient to see all the packet traffic on network architecture 100. However, port mirroring or various network taps may be used to extend the packet capture to any point on the network. The packet capture request may yield a plurality of packets as well as metadata for each packet which computing device 130C may store in memory 132. Computing device 130C may analyze the plurality of captured packets and any metadata in real time or store them in storage 132C and save them for later analysis. The plurality of packets may include each physical layer frame (e.g., Ethernet frame) captured, as well as the higher level packets (e.g., application layer packets, IP layer packets) contained in each captured physical layer frame.

Computing device 130C may decapsulate each captured physical layer frame to detect the various higher level packets contained therein. Because module 132A may understand the structure of different networking protocols, computing device 130C may extract information about the fields of each one of the headers and layers of the packets that are captured. More specifically, module 132A may provide a statistical breakdown of the contents of a packet capture and a protocol hierarchy that shows a dissection of the captured plurality of packets on a per network stack level basis. Each packet may contain multiple protocols, and a single packet can contain the same protocol more than once. In some embodiments, module 132A may count a protocol as many times as it appears in a packet. As a result more than one protocol may be counted for each packet. For example, ICMP replies and many tunneling protocols may carry more than one IP header.

FIG. 2 illustrates a chart 200 of the statistical break down by network stack level of packets from a packet capture. The chart 200 may display the levels of the network stack (Physical, Data link, Network, Transport and Application) as well as the number of packets from each level of the network stack. Each row contains the statistical values of one protocol. In the example illustrated in FIG. 2, 445 physical layer frames were captured in the packet capture. Decapsulating each of the 445 frames resulted in 445 ethernet packets. Decapsulating each of the 445 Ethernet packets resulted in 178 IPV6 packets and 276 IPV4 packets. Decapsulating all of the IPV6 packets reveals that of the 178 IPV6 packets, 174 were TCP packets, of which 26 were HTTP packets. The breakdown of content of those 26 HTTP packets is shown in the "type" column. Decapsulating the 276 IPV4 packets resulted in 74 user datagram protocol packets and 188 TCP packets. Of the 188 TCP packets, 24 were HTTP packets. The breakdown of content of those 24 HTTP packets is shown in the "type" column. It should be noted that protocol layers may consist of packets that may not contain any higher layer protocol, so the sum of all higher layer packets may not add up to the protocols packet count. This may be caused by continuation frames, TCP protocol overhead, and other undissected data, for example.

Referring back to FIG. 1B, computing device 130C may provide for each captured packet, metadata including: a timestamp of when the packet was captured, the source address (IP address or any other appropriate address) where the packet originated, the destination address that the packet is being sent to, the packet's protocol name (e.g., TCP), the packet length in bytes (or any other suitable unit), and information about the packet's payload. Computing device 130C may also provide metadata indicating whether a packet or group of packets from the packet capture are all part of the same back-and-forth network conversation between components on the network architecture 100 (based, at least in part, on e.g., the source and destination address of the packets). A network conversation may refer to the traffic between two specific components of the network architecture 100. For example, an IP conversation may be all the traffic between two IP addresses. Computing device 130C may also indicate (via metadata) for each captured packet a known context (or, relationship) to other packets in the network conversation. For example, computing device 130C may indicate if any packets in the network conversation are in a request/response relationship, or a sequence/acknowledge relationship. Computing device 130C may detect one or more communication patterns at one or more levels of the network stack based on the metadata extracted from the plurality of captured packets. A communication pattern may be defined by packets that are part of the same network conversation, the protocol of the packets in the network conversation, the context (or, relationship) of each packet to other packets in the network conversation, and the payload of each of the packets in the network conversation, among others. Computing device 130C may determine communication patterns among packets at one or more levels of the network stack, such as communication patterns of HTTP packets or TLS packets, among others.

For example, computing device 130C may analyze physical layer frames and detect a physical layer communication pattern including a set of the physical layer frames. Computing device 130C may detect the pattern based on the source and destination address of the frames (indicating that they are part of the same back and forth network conversation) as well as a communication protocol (e.g., Ethernet, 802.11 (WiFi™), Bluetooth, I²C, and optical transport Network among others) of the frames in the set as well as the context that frames in the set have to each other (as discussed above). Computing device 130C may also consider the payload of each frame. Continuing the previous example, computing device 130C may then analyze network layer packets within the captured physical layer frames and may detect a network layer communication pattern including a set of network layer packets. In some embodiments, the set of network layer packets may be encapsulated within the frames that form the physical layer communication pattern, while in other embodiments the set of network layer packets may be encapsulated in other captured physical layer frames. Computing device 130C may detect that the set of network layer packets are part of the same network conversation based on the source and destination address and also determine that all of the packets utilize the same communication protocol (e.g., IPv4, IPv6, ICMP, ICMPv6, ECN, IGMP, IPsec). Computing device 130C may also detect a context that packets in the set have to each other (as discussed above) and the payload of each packet in the set.

In other examples, computing device 130C may then analyze link layer packets from the packet capture and determine a set of link layer packets that form a link layer communication pattern. Computing device 130C may detect that a set of link layer packets are part of the same network conversation based on the source and destination address of each packet and also determine that all of the packets in the set utilize the same communication protocol (e.g., ARP, NDP, OSPF, L2PP (Tunnels) and MAC (Ethernet, WiFi™ among others) used to communicate the link layer packets as well as the context that link layer packets in the set have to each other (as discussed above) along with the payload of each packet in the set. In another example, the computing device 130C may examine each application layer packet from the packet capture and determine a set of application layer packets that form an application layer communication pattern. Computing device 130C may determine the application layer communication pattern based on the source and destination address (indicating a network conversation) as well as a communication protocol for each application layer packet (e.g., BGP, DHCP, DNS, FTP, HTTP, HTTPS, IMAP, LDAP, POP, RTP, RTSP, RIP, and SIP) as well as the context (relationship) that application layer packets in the set have to each other (as discussed above) and the payload of each packet. In this way, computing device 130C may determine one or more communication patterns at each of one or more levels of the network stack.

For example, computing device 130C may detect a communication pattern indicating a set of link layer packets communicated back and forth between computing devices 130A and 130B and that the set of packets include address routing protocol (ARP) requests from 130B to 130A and responses to the ARP requests from 130A to 130B (thus indicating that 130A is a network card, for example). In another example, the module 132A may detect a communication pattern indicating a set of application layer packets communicated between applications 131B and 131A and determine that the set of packets include HTTP requests from application 131A to application 131B and responses to the HTTP requests from application 131B to application 131B (utilizing the HTTP protocol). This may indicate for example, that the set of application layer packets are part of the same web page request(s) and that application 131A may be a web browser attempting to access content hosted by application 131B, which may be a website hosted on computing device 130B. Computing device 130C may also determine based on this that computing device 130B is a web server.

Computing device 130C may execute module 132B to generate a topology of the network architecture 100 based on the communication patterns detected from the packet capture. In some embodiments, computing device 130C may extract, from each communication pattern from each layer of the network stack, information about a source and destination component, the protocol used for the communication, the context (or, relationship) that the packets in the communication pattern have to each other and the payload of the packets involved in the communication pattern. Computing device 130C may use this information to determine the type of the components the network architecture 100 is comprised of (e.g., network cards, databases, web servers, virtual machines, applications etc.) as discussed above. Based on the communication patterns detected from analyzing one or more levels of the network stack, computing device 130C may generate a topology for one or more levels of the network stack.

For example, computing device 130C may analyze an application layer communication pattern indicating a set of HTTP protocol packets exchanged between applications 131B and 131A and that the set of packets include HTTP requests from application 131A to application 131B and responses to the HTTP requests from application 131B to application 131B (utilizing the HTTP protocol). Based on this, computing device 130C may determine that the set of application layer packets are part of the same web page request(s) and that application 131A may be a web browser attempting to access content hosted by application 131B which may be a website hosted on computing device 130B. Computing device 130C may also determine based on this that computing device 130B may be a web server. In this manner, computing device 130C may build an application layer topology including all of the application layer components (applications etc.) running on the network 100.

In addition, computing device 130C may analyze a transport layer communication pattern indicating a set of TCP packets exchanged between computing devices 130B and 130A and that the set of packets include TCP connection requests from computing device 130A to 130B and TCP connection acknowledgements from computing device 130B to 130A. Thus, computing device 130C may determine that 130B is a web server, for example. In this way, module 132B may utilize the communication patterns from one or more levels of the network stack to build a complete network topology (i.e. a network topology reflecting the full stack) by determining the type of each device in the network and the manner in which they are connected, as well as the operating systems and applications running on each device and the manner in which they are connected (if any). The network topology may indicate how each of the components (whether device or application) of the network 100 are connected to each other using the source and destination address of packets involved in each communication pattern. In some embodiments, computing device 130C may also include a probability that each component is correctly identified (e.g., as a network card, web hosting server, operating system, virtual machine, streaming application, etc.) and a probability that each connection in the network topology is correct based on information from the communication patterns detected by module 132A. The probability may be based on a number of factors indicating a type of a particular component or connection to other components. In the example above, the application layer and transport layer communication patterns indicated that computing device 130B is a web server, thus the network topology generated by computing device 130C may assign a higher probability of computing device 130B being a web server than if only an application layer communication pattern had indicated computing device 130B as a web server. A network topology generated in this manner may provide an application level, operating system level, and hardware level understanding of the network architecture 100 and its components.

In some embodiments, computing device 130C may also use a machine learning algorithm to generate the network topology. For example, computing device 130C may use a neural network that is trained on a set of known network topologies such that it may learn the characteristics of (communication patterns included in) various different known topologies. The computing device 130C may utilize the neural network to compare the information from the detected communication patterns to known network topologies and match the information to a known network topology.

Figure 3A:
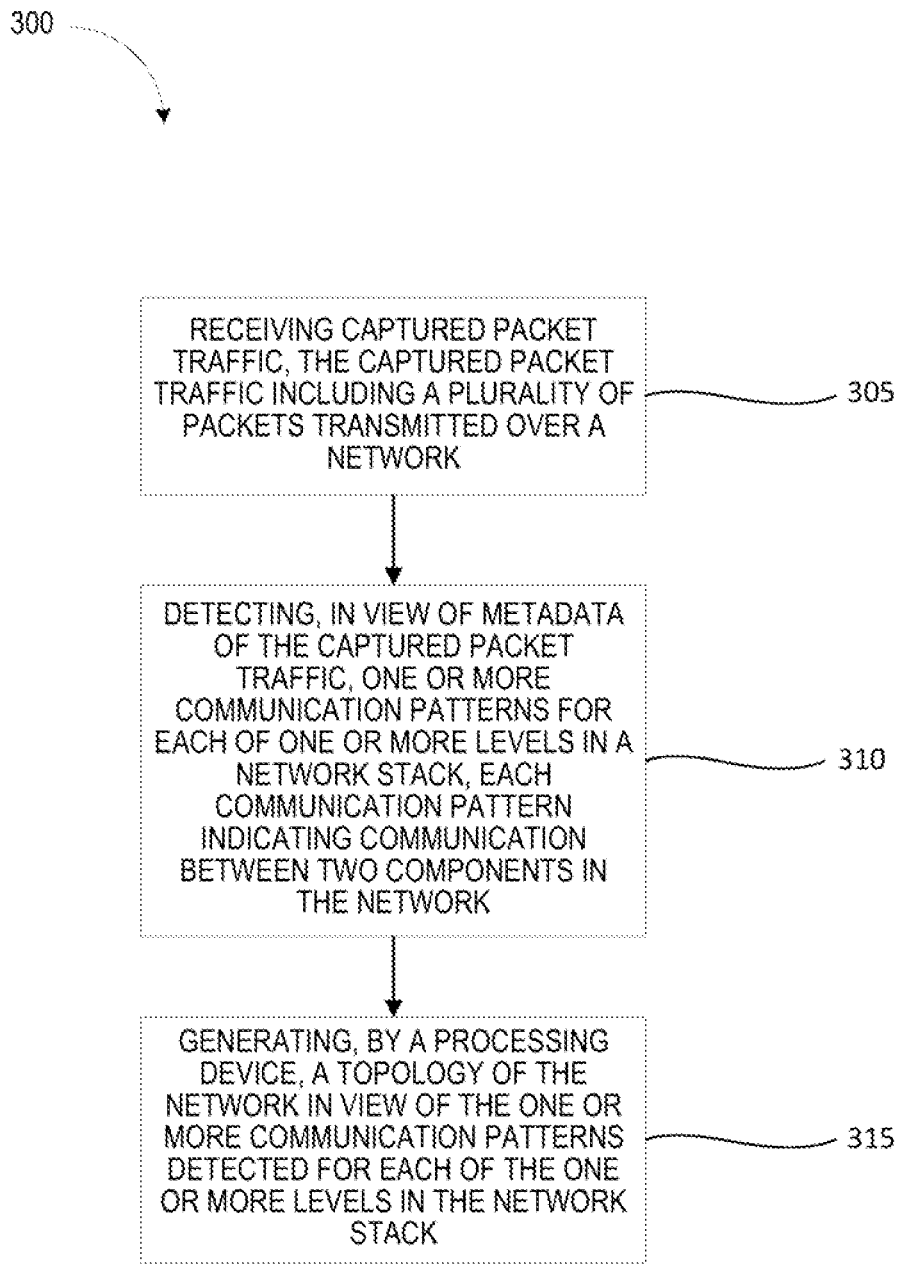
FIG. 3A is a flow diagram of an example method for building a network topology, in accordance with some embodiments of the present disclosure.

FIG. 3A is a flow diagram illustrating a method 300 for determining a network topology, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 130C illustrated in FIGS. 1A and 1B).

At block 305, computing device 130C may receive captured packet traffic, wherein the captured packet traffic may include a plurality of packets transmitted over network architecture 100. Computing device 130C may send packet capture requests to router 110A in order to obtain network traces indicating traffic on the network as will be described in further detail herein. In some embodiments, computing device 130C may instruct the router 110A to behave in a "promiscuous" mode, wherein all traffic visible on router 110A, including unicast traffic not sent to the router 110A's MAC address is visible. Because some traffic through the router 110A may be sent to other ports than the port where the capture was requested, capturing with the router 110A in "promiscuous" mode may not be sufficient to see all the packet traffic on network architecture 100. However, port mirroring or various network taps may be used to extend the packet capture to any point on the network. The packet capture request may yield a plurality of packets as well as metadata for each packet which computing device 130C may store in memory 132. Computing device 130C may analyze the plurality of captured packets in real time or store them in storage 132C and save them for later analysis. The plurality of packets may refer to each physical layer frame (e.g., Ethernet frame) captured, as well as the higher level packets (e.g., application layer packets, IP layer packets) contained in each captured physical layer frame.

Computing device 130C may decapsulate each captured physical layer frame to detect the various packets contained therein. Because module 132A may understand the structure of different networking protocols, computing device 130C may extract information about the fields of each one of the headers and layers of the packets that are captured. More specifically, module 132A may provide a statistical breakdown of the contents of a packet capture and a protocol hierarchy that shows a dissection of the captured plurality of packets on a per network stack level basis. Each packet may contain multiple protocols, and a single packet can contain the same protocol more than once. In some embodiments, module 132A may count a protocol as many times as it appears in a packet. As a result more than one protocol may be counted for each packet. For example, ICMP replies and many tunneling protocols may carry more than one IP header.

At block 310, computing device 130C may detect, based on metadata of the captured packet traffic, one or more communication patterns for each of one or more levels of the network stack. Each communication pattern may indicate characteristics of the communication between two components in the network. Computing device 130C may provide for each captured packet, metadata including: a timestamp of when the packet was captured, the source address (IP address or any other appropriate address) where the packet originated, the destination address that the packet is being sent to, the packet's protocol name (e.g., TCP), the packet length in bytes (or any other suitable unit), and information about the packet's payload. Computing device 130C may also provide metadata indicating whether a packet or group of packets from the packet capture are all part of the same back-and-forth network conversation between components on the network architecture 100 (based on e.g., the source and destination address of the packets). A network conversation may refer to the traffic between two specific components of the network architecture 100. For example, an IP network conversation is all the traffic between two IP addresses. Computing device 130C may also indicate (in the metadata) for each captured packet a known context (relationship) to other packets in the network conversation. For example, computing device 130C may indicate if any packets in the network conversation are in a request/response relationship, or a sequence/acknowledge relationship. Computing device 130C may detect one or more communication patterns at one or more levels of the network stack based on the metadata extracted from the plurality of captured packets. A communication pattern may be defined by packets that are part of the same network conversation, the protocol of the packets in the network conversation, the context (relationship) of each packet to other packets in the network conversation, and the payload of each of the packets in the network conversation, among other factors. Computing device 130C may determine communication patterns among packets at one or more levels of the network stack, such as communication patterns of HTTP packets or TLS packets, among others.

For example, computing device 130C may analyze physical layer frames and detect a physical layer communication pattern including a set of the physical layer frames. Computing device 130C may detect the pattern based on the source and destination address of the frames (indicating that they are part of the same back and forth conversation) as well as a communication protocol (e.g., Ethernet, 802.11 (WiFi™), Bluetooth, I²C, and optical transport Network among others) for each frame in the set as well as the context that frames in the set have to each other (as discussed above). Computing device 130C may also consider the payload of each frame. Continuing the previous example, computing device 130C may then analyze network layer packets within the captured physical layer frames and may detect a network layer communication pattern including a set of network layer packets. In some embodiments, the set of network layer packets may be encapsulated within the frames that form the physical layer communication pattern, while in other embodiments the set of network layer packets may be encapsulated in other captured physical layer frames. Computing device 130C may detect that the set of network layer packets are part of the same network conversation based on the source and destination address and also determine that all of the packets utilize the same communication protocol (e.g., IPv4, IPv6, ICMP, ICMPv6, ECN, IGMP, IPsec). Computing device 130C may also detect a context that packets in the set have to each other (as discussed above) and the payload of each packet in the set.

Figure 3B:
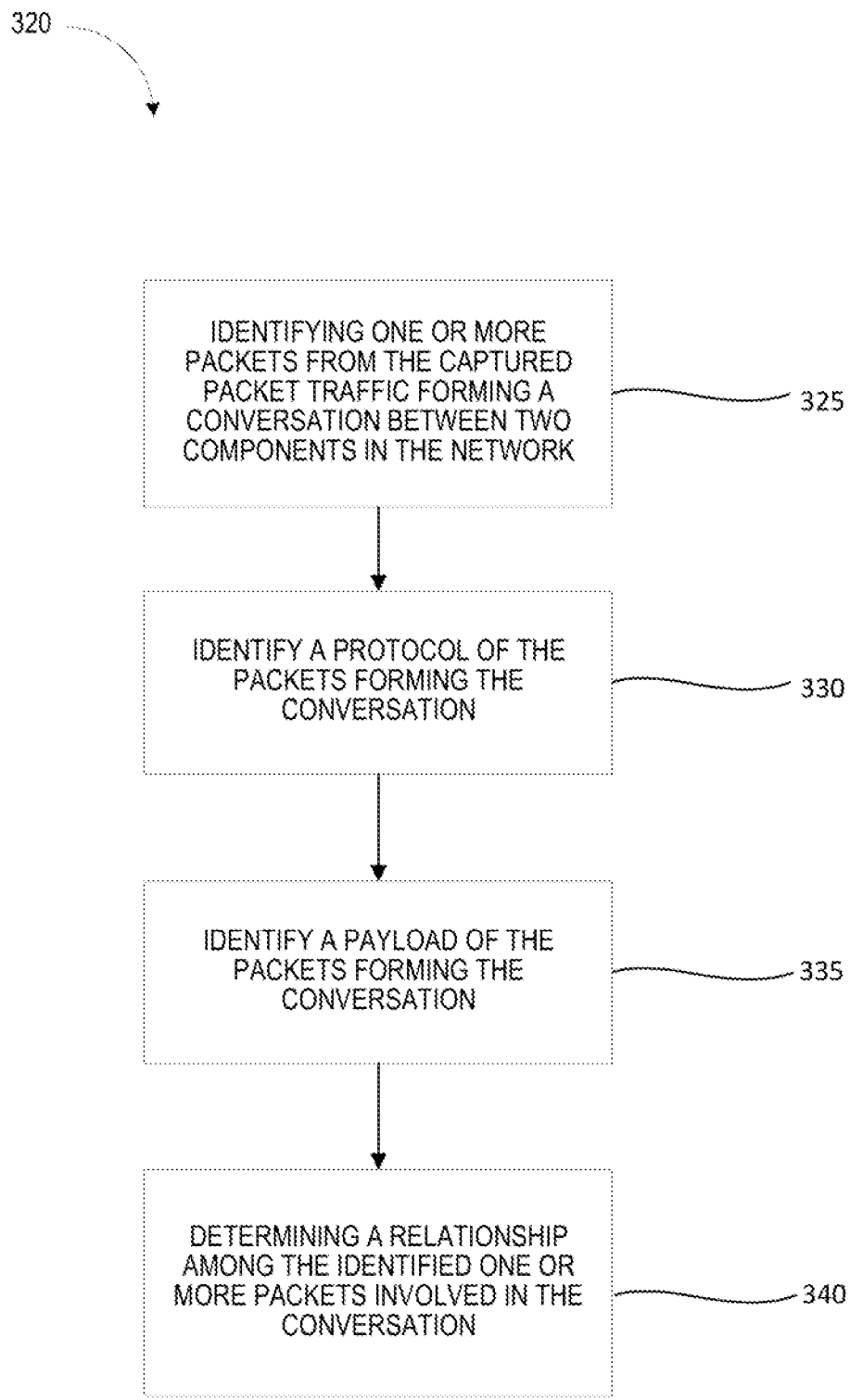
FIG. 3B is a flow diagram of an example method for detecting communication patterns between components on a network.

FIG. 3B is a flow diagram illustrating a method 320 for detecting a communication pattern, in accordance with some embodiments. Method 320 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 320 may be performed by a computing device (e.g., computing device 130C illustrated in FIGS. 1A and 1B).

At block 325, computing device 130C may identify one or more packets from the captured packet traffic forming a conversation between two components in the network. At block 330, computing device 130C may identify a protocol of the packets forming the network conversation. At block 335, computing device 130C may identify a payload of each packet forming the network conversation. At block 340, computing device 130C may determine a relationship among the packets involved in the network conversation. Based on this information, computing device 130C detect a communication pattern.

For example, computing device 130C may detect a communication pattern indicating a set of link layer packets communicated back and forth between computing devices 130A and 130B and that the set of packets include address routing protocol (ARP) requests from 130B to 130A and responses to the ARP requests from 130A to 130B (thus indicating that 130A is a network card, for example). In another example, the module 132A may detect a communication pattern indicating a set of application layer packets communicated between applications 131B and 131A and determine that the set of packets include HTTP requests from application 131A to application 131B and responses to the HTTP requests from application 131B to application 131B (utilizing the HTTP protocol). This may indicate for example, that the set of application layer packets are part of the same web page request(s) and that application 131A may be a web browser attempting to access content hosted by application 131B which may be a website hosted on computing device 130B. Computing device 130C may also determine based on this that computing device 130B is a web server.

Referring back to FIG. 3A, at block 315, computing device 130C may determine a topology of the network in view of the communication patterns detected for each of the one or more levels in the network stack. In some embodiments, computing device 130C may extract, from each communication pattern from each layer of the network stack, information about a source and destination component, the protocol used for the communication, the context that the packets in communication pattern have to each other and the payload of the packets involved in the communication pattern. Computing device 130C may use this information to determine the type of the components the network architecture is comprised of (e.g., network cards, databases, web servers, virtual machines, applications etc.) as discussed above. Based on the communication patterns detected from analyzing one or more level of the network stack, computing device 130C may generate a topology for one or more levels of the network stack. For example, computing device 130C may analyze an application layer communication pattern indicating a set of HTTP protocol packets exchanged between applications 131B and 131A and that the set of packets include HTTP requests from application 131A to application 131B and responses to the HTTP requests from application 131B to application 131B (utilizing the HTTP protocol). Based on this, computing device 130C may determine that the set of application layer packets are part of the same web page request(s) and that application 131A may be a web browser attempting to access content hosted by application 131B which may be a website hosted on computing device 130B. Computing device 130C may also determine based on this that computing device 130B may be a web server. In this manner, computing device 130C may build an application layer topology including all of the application layer components (applications etc.) running on the network 100.

In addition, computing device 130C may analyze a transport layer communication pattern indicating a set of TCP packets exchanged between computing devices 130B and 130A and that the set of packets include TCP connection requests from computing device 130A to 130B and TCP connection acknowledgements from computing device 130B to 130A. Thus, computing device 130C may determine that 130B is a web server, for example. In this way, module 132B may utilize the communication patterns from one or more levels of the network stack to build a complete network topology by determining the type of each device in the network and the manner in which they are connected, as well as the operating systems and applications running on each device and the manner in which they are connected (if any). The network topology may indicate how each of the components (whether device or application) of the network 100 are connected to each other using the source and destination address of packets involved in each communication pattern. In some embodiments, computing device 130C may also include a probability that each component is correctly identified (e.g., as a network card, web hosting server, operating system, virtual machine, streaming application, etc.) and a probability that each connection in the network topology is correct based on information from the communication patterns detected by module 132A. The probability may be based on a number of factors indicating a type of a particular component or connection to other components. In the example above, the application layer and transport layer communication patterns indicated that computing device 130B is a web server, thus the network topology generated by computing device 130C may assign a higher probability of computing device 130B being a web server than if only an application layer communication pattern had indicated computing device 130B as a web server.

In some embodiments, computing device 130C may also use a machine learning algorithm to generate the network topology. For example, computing device 130C may use a neural network that is trained on a set of known network topologies such that it may learn the characteristics of various different known topologies. The computing device 130C may utilize the neural network to compare the information from the detected communication patterns to known network topologies and match the information to a network topology.

Figure 4:
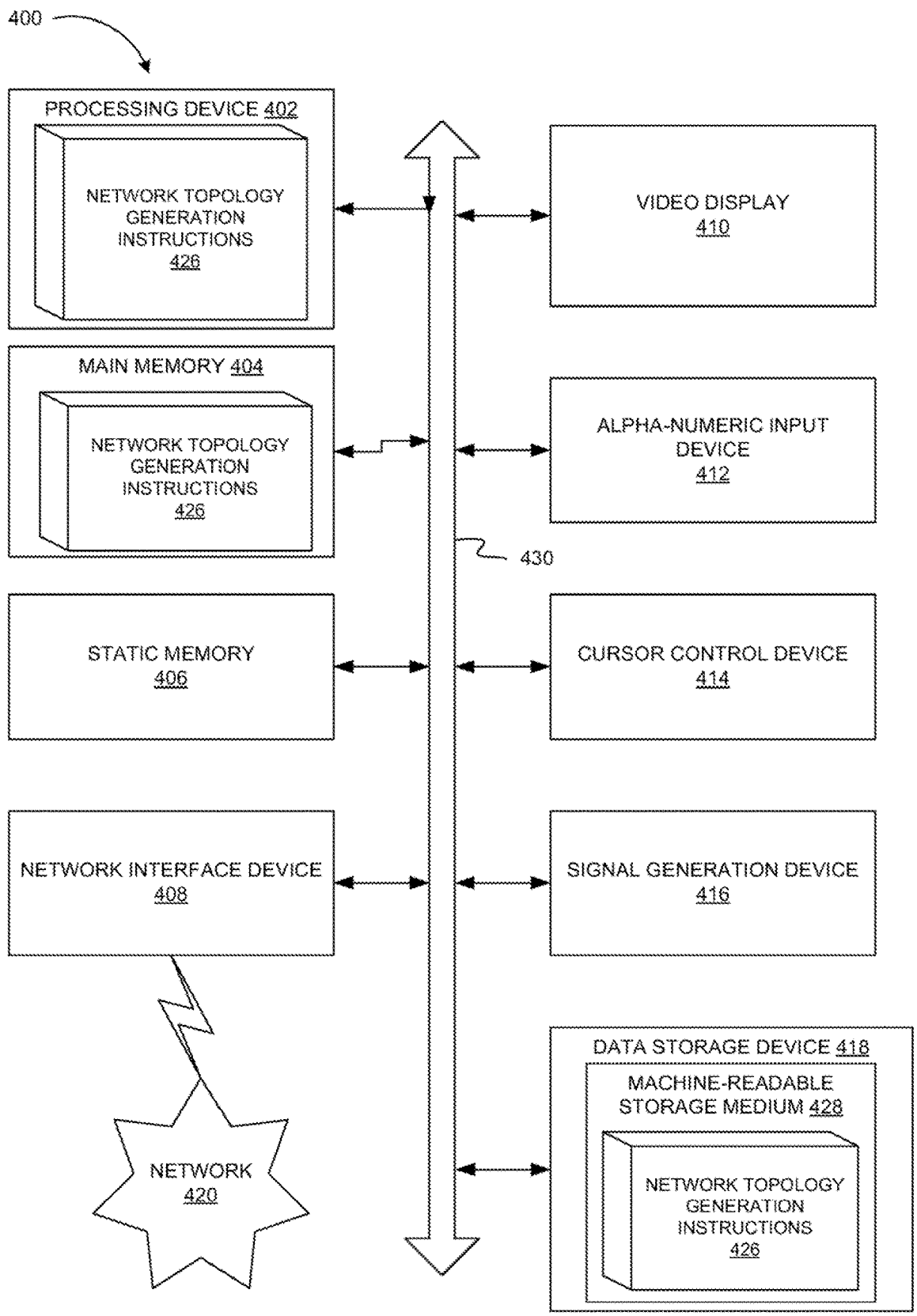
FIG. 4 is a block diagram of an example computing device, in accordance with some embodiments of the present disclosure.

FIG. 4 illustrates a diagrammatic representation of a machine in the example form of a computer system 400 within which a set of instructions, for causing the machine to perform any one or more of the methodologies discussed herein for determining a network topology. More specifically, the machine may receive captured packet traffic, the captured packet traffic including a plurality of packets transmitted over a network. The machine may detect, based on metadata of the captured packet traffic, one or more communication patterns for each of one or more levels in a network stack, where each communication pattern indicates communication between two components in the network. The machine may generate a topology of the network based on the one or more communication patterns detected for each of the one or more levels in the network stack.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a server, such as DSL server 110 configured to perform multi-level task debugging.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute network topology generation instructions 426, for performing the operations and steps discussed herein.

The data storage device 418 may include a machine-readable storage medium 428, on which is stored one or more sets of network topology generation instructions 426 (e.g., software) embodying any one or more of the methodologies of functions described herein, including instructions to cause the processing device 402 to execute scripts 121A shown in FIG. 1B. The network topology generation instructions 426 may also reside, completely or at least partially, within the main memory 404 or within the processing device 402 during execution thereof by the computer system 400; the main memory 404 and the processing device 402 also constituting machine-readable storage media. The instructions 422 may further be transmitted or received over a network 420 via the network interface device 408.

The machine-readable storage medium 428 may also be used to store instructions to perform a method for object analysis/validation event publishing, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
    receiving captured packet traffic, the captured packet traffic including a plurality of packets transmitted over a network;
    detecting, using metadata of the captured packet traffic, one or more communication patterns within each of one or more levels in a network stack, wherein each of the one or more communication patterns is detected by:
        identifying one or more packets from the captured packet traffic forming a network conversation between two components in the network, each of the one or more packets having a protocol corresponding to the level in the network stack;
        identifying a context among the identified one or more packets involved in the network conversation; and
        detecting the communication pattern based on the network conversation, the context among the identified one or more packets, and a payload of each of the one or more packets, wherein the metadata of the captured packet traffic includes a source address, a destination address, and a protocol name for each packet of the captured packet traffic; and
    generating, by a processing device, a topology of the network in view of the one or more communication patterns detected within each of the one or more levels in the network stack.

2. The method of claim 1, wherein the topology of the network indicates for each component in the network: a type of the component and a connection between the component and one or more other components in the network.

3. The method of claim 2, wherein generating the topology of the network comprises:
    determining a type of each component in the network and a connection between each component and one or more other components in the network in view of the one or more communication patterns detected within each of the one or more levels in the network stack.

4. The method of claim 3, wherein the determining comprises:
    mapping the detected one or more communication patterns within each of the one or more levels in the network stack to a network topology from a data set of known network topologies using a neural network, the neural network being trained on the data set of known network topologies.

5. A system comprising:
    a memory to store metadata; and
    a processing device to:
        receive captured packet traffic from a network device, the captured packet traffic including a plurality of packets transmitted over a network;
        detect, using metadata of the captured packet traffic, one or more communication patterns within each of one or more levels in a network stack, wherein each of the one or more communication patterns is detected by:
            identifying one or more packets from the captured packet traffic forming a network conversation between two components in the network, each of the one or more packets having a protocol corresponding to the level in the network stack;
            identifying a context among the identified one or more packets involved in the network conversation; and
            detecting the communication pattern based on the network conversation, the context among the identified one or more packets, and a payload of each of the one or more packets, wherein the metadata of the captured packet traffic includes a source address, a destination address, and a protocol name for each packet of the captured packet traffic; and
        generate a topology of the network in view of the one or more communication patterns detected within each of the one or more levels in the network stack.

6. The system of claim 5, wherein the topology of the network indicates for each component in the network: a type of the component and a connection between the component and one or more other components in the network.

7. The system of claim 6, wherein to generate the topology of the network, the processing device is further to:
    determine a type of each component in the network and a connection between each component and one or more other components in the network in view of the one or more communication patterns detected within each of the one or more levels in the network stack.

8. The system of claim 7, wherein to determine the type of each component in the network and the connection between each component and one or more other components, the processing device is further to:
    map the detected one or more communication patterns within each of the one or more levels in the network stack to a network topology from a data set of known network topologies using a neural network, the neural network being trained on the data set of known network topologies.

9. The system of claim 8, wherein the topology of the network further indicates a probability that the type of each component is correct and a probability that each connection is correct.

10. A non-transitory computer-readable storage medium including instructions that, when executed by a processing device, cause the processing device to:
receive captured packet traffic, the captured packet traffic including a plurality of packets transmitted over a network;
detect, using metadata of the captured packet traffic, one or more communication patterns within each of one or more levels in a network stack, wherein each of the one or more communication patterns is detected by:
identifying one or more packets from the captured packet traffic forming a network conversation between two components in the network, each of the one or more packets having a protocol corresponding to the level in the network stack;
identifying a context among the identified one or more packets involved in the network conversation; and
detecting the communication pattern based on the network conversation, the context among the identified one or more packets, and a payload of each of the one or more packets, wherein the metadata of the captured packet traffic includes a source address, a destination address, and a protocol name for each packet of the captured packet traffic; and
generate, by the processing device, a topology of the network in view of the one or more communication patterns detected within each of the one or more levels in the network stack.

11. The non-transitory computer-readable storage medium of claim 10, wherein the topology of the network indicates for each component in the network: a type of the component and a connection between the component and one or more other components in the network.

12. The non-transitory computer-readable storage medium of claim 11, wherein to generate the topology of the network, the processing device is further to:
determine a type of each component in the network and a connection between each component and one or more other components in the network in view of the one or more communication patterns detected within each of the one or more levels in the network stack.

13. The non-transitory computer-readable storage medium of claim 12, wherein to determine the type of each component in the network and the connection between each component and one or more other components, the processing device is further to:
map the detected one or more communication patterns within each of the one or more levels in the network stack to a network topology from a data set of known network topologies using a neural network, the neural network being trained on the data set of known network topologies.

14. The non-transitory computer-readable storage medium of claim 11, wherein the topology of the network further indicates for each component in the network a probability that the type of the component is correct and a probability that each connection between the component and one or more other components in the network is correct.

* * * * *